(12) United States Patent
Feichtinger et al.

(10) Patent No.: US 9,289,774 B2
(45) Date of Patent: Mar. 22, 2016

(54) APPARATUS FOR THE PRETREATMENT AND SUBSEQUENT CONVEYING, PLASTIFICATION, OR AGGLOMERATION OF PLASTICS

(71) Applicant: Erema Engineering Recycling Maschinen und Anlagen Gesellschaft M.B.H., Ansfelden (AT)

(72) Inventors: Klaus Feichtinger, Linz (AT); Manfred Hackl, Linz-Urfahr (AT)

(73) Assignee: EREMA ENGINEERING RECYCLING MASCHINEN UND ANLAGEN GESELLSCHAFT M.B.H., Ansfelden (AT)

( * ) Notice: Subject to any disclaimer, the term of this patent is extended or adjusted under 35 U.S.C. 154(b) by 0 days.

(21) Appl. No.: 14/351,855

(22) PCT Filed: Oct. 12, 2012

(86) PCT No.: PCT/AT2012/050156
§ 371 (c)(1),
(2) Date: Apr. 14, 2014

(87) PCT Pub. No.: WO2013/052984
PCT Pub. Date: Apr. 18, 2013

(65) Prior Publication Data
US 2014/0239104 A1    Aug. 28, 2014

(30) Foreign Application Priority Data

Oct. 14, 2011    (AT) ................................ A 1511/2011

(51) Int. Cl.
*B29C 47/10*    (2006.01)
*B02C 17/00*    (2006.01)
(Continued)

(52) U.S. Cl.
CPC ........... *B02C 17/002* (2013.01); *B01F 15/0289* (2013.01); *B02C 18/086* (2013.01);
(Continued)

(58) Field of Classification Search
CPC .. B01F 7/162; B01F 15/0288; B01F 15/0289; B29B 2017/048; B29B 17/0412; B02C 18/086; B29C 47/1027
USPC ......... 366/76.2, 76.3, 76.4, 76.6, 76.9, 76.91, 366/76.92, 76.93, 154.1, 155.1, 156.1, 366/158.4, 91, 147, 149, 168.1, 172.1, 366/172.2, 200, 314; 425/586–587
See application file for complete search history.

(56) References Cited

U.S. PATENT DOCUMENTS 2,927,007 A    3/1960    Kaether
3,867,194 A    2/1975    Straube
(Continued)

FOREIGN PATENT DOCUMENTS

AT    400315 B    12/1995
CN    101186103 A    5/2008
(Continued)

OTHER PUBLICATIONS

International Preliminary Report on Patentability mailed Feb. 17, 2014, from PCT Application No. PCT/AT2012/050156 (11 pages).
(Continued)

*Primary Examiner* — Charles Cooley
(74) *Attorney, Agent, or Firm* — Kilpatrick Townsend & Stockton LLP

(57) ABSTRACT

Disclosed is an apparatus for the processing of plastics, having a container with a rotatable mixing implement, where a conveyor is provided, with a screw rotating in a housing, wherein the imaginary continuation of the longitudinal axis of the conveyor in a direction opposite to the direction of conveying passes the axis of rotation, where, on the outflow side, there is an offset distance between the longitudinal axis and the radial that is parallel to the longitudinal axis, wherein on the internal wall area of the container, there is at least one bar-shaped deflector which is directed into the interior of the container, and the height profile of which decreases in the direction of rotation of the mixing implement, seen from above, and the angle included thereby, over its length, with a plane (E) perpendicular to the axis of rotation of the mixing implements is an acute angle ($\alpha$).

23 Claims, 4 Drawing Sheets

(51) Int. Cl.

| | |
|---|---|
| *B01F 15/02* | (2006.01) |
| *B29B 13/10* | (2006.01) |
| *B29B 17/00* | (2006.01) |
| *B29B 17/04* | (2006.01) |
| *B02C 18/08* | (2006.01) |
| *B29B 7/66* | (2006.01) |
| *B29C 47/00* | (2006.01) |
| *B29C 47/38* | (2006.01) |
| *B29C 47/40* | (2006.01) |
| *B29C 47/58* | (2006.01) |
| *B29K 105/26* | (2006.01) |

(52) U.S. Cl.
CPC .................. *B29B 7/66* (2013.01); *B29B 13/10* (2013.01); *B29B 17/0026* (2013.01); *B29B 17/0412* (2013.01); *B29C 47/0011* (2013.01); *B29C 47/1018* (2013.01); *B29C 47/38* (2013.01); *B29B 2017/048* (2013.01); *B29C 47/0009* (2013.01); *B29C 47/1027* (2013.01); *B29C 47/40* (2013.01); *B29C 47/585* (2013.01); *B29K 2105/26* (2013.01); *Y02W 30/62* (2015.05); *Y02W 30/625* (2015.05)

(56) References Cited

U.S. PATENT DOCUMENTS

| | | | |
|---|---|---|---|
| 4,015,781 A | 4/1977 | Beck | |
| 4,579,288 A | 4/1986 | McDermid et al. | |
| 5,102,326 A * | 4/1992 | Bacher et al. | 425/202 |
| 5,282,548 A * | 2/1994 | Ishihara | 222/55 |
| 5,651,944 A * | 7/1997 | Schulz et al. | 422/137 |
| 5,783,225 A * | 7/1998 | Bacher et al. | 425/202 |
| 5,882,558 A * | 3/1999 | Bacher et al. | 264/40.4 |
| 5,988,865 A * | 11/1999 | Bacher et al. | 366/76.93 |
| 6,619,575 B1 | 9/2003 | Bacher et al. | 241/46.11 |
| 6,719,454 B1 * | 4/2004 | Bacher et al. | 366/314 |
| 6,784,214 B1 * | 8/2004 | Bacher et al. | 521/48 |
| 6,883,953 B1 * | 4/2005 | Bacher et al. | 366/76.1 |
| 7,275,703 B2 * | 10/2007 | Bacher et al. | 241/152.2 |
| 7,275,857 B2 * | 10/2007 | Bacher et al. | 366/314 |
| 7,291,001 B2 * | 11/2007 | Bacher et al. | 425/202 |
| 7,309,224 B2 * | 12/2007 | Bacher et al. | 425/202 |
| 7,842,221 B2 * | 11/2010 | Magni et al. | 264/322 |
| 8,399,599 B2 * | 3/2013 | Hackl et al. | 528/308.3 |
| 8,419,997 B2 * | 4/2013 | Hackl et al. | 264/328.17 |
| 8,616,478 B2 * | 12/2013 | Weigerstorfer et al. | 241/57 |
| 8,992,067 B2 | 3/2015 | Bacher et al. | |
| 2004/0202744 A1 | 10/2004 | Bacher et al. | |
| 2004/0232578 A1 | 11/2004 | Magni et al. | |
| 2006/0093696 A1 * | 5/2006 | Bacher et al. | 425/200 |
| 2006/0292259 A1 * | 12/2006 | Bacher et al. | 425/217 |
| 2007/0007375 A1 * | 1/2007 | Bacher et al. | 241/199.14 |
| 2007/0102550 A1 * | 5/2007 | Lin | 241/277 |
| 2010/0101454 A1 * | 4/2010 | Wendelin et al. | 106/243 |
| 2010/0140381 A1 * | 6/2010 | Weigerstorfer et al. | 241/17 |
| 2011/0049763 A1 * | 3/2011 | Hackl et al. | 264/328.17 |
| 2011/0251368 A1 * | 10/2011 | Hackl et al. | 526/352 |
| 2012/0091609 A1 * | 4/2012 | Feichtinger et al. | 264/37.31 |
| 2012/0200000 A1 | 8/2012 | Klein et al. | |
| 2013/0092768 A1 * | 4/2013 | Feichtinger et al. | 241/20 |
| 2013/0113139 A1 * | 5/2013 | Weigerstorfer et al. | 264/340 |
| 2013/0168201 A1 * | 7/2013 | Hackl et al. | 193/2 R |
| 2014/0234461 A1 * | 8/2014 | Feichtinger et al. | 425/202 |
| 2014/0234462 A1 * | 8/2014 | Feichtinger et al. | 425/202 |
| 2014/0239104 A1 * | 8/2014 | Feichtinger et al. | 241/188.1 |
| 2014/0248388 A1 * | 9/2014 | Feichtinger et al. | 425/203 |
| 2014/0252147 A1 | 9/2014 | Feichtinger et al. | |
| 2014/0252148 A1 | 9/2014 | Feichtinger et al. | |
| 2014/0271968 A1 | 9/2014 | Feichtinger et al. | |
| 2014/0287081 A1 | 9/2014 | Feichtinger et al. | |
| 2014/0291427 A1 | 10/2014 | Feichtinger et al. | |
| 2014/0295016 A1 | 10/2014 | Feichtinger et al. | |
| 2014/0299700 A1 | 10/2014 | Feichtinger et al. | |
| 2014/0312151 A1 | 10/2014 | Feichtinger et al. | |
| 2015/0239154 A1 * | 8/2015 | Feichtinger | B29B 17/0036 |

FOREIGN PATENT DOCUMENTS

| | | |
|---|---|---|
| DE | 2839446 B1 | 1/1980 |
| DE | 3525554 A1 | 2/1986 |
| DE | 10140215 A1 | 2/2003 |
| DE | 202009015256 U1 | 4/2010 |
| EP | 0045734 A1 | 2/1982 |
| EP | 0103754 A1 | 3/1984 |
| EP | 0123771 A1 | 11/1984 |
| EP | 0321742 A1 | 6/1989 |
| EP | 0701505 A1 | 3/1996 |
| EP | 0735945 A1 | 10/1996 |
| EP | 0911131 A1 | 4/1999 |
| EP | 1181141 A1 | 2/2002 |
| EP | 1233855 A1 | 8/2002 |
| EP | 0820375 A1 | 1/2003 |
| EP | 1273412 A1 | 1/2003 |
| EP | 1401623 A1 | 3/2004 |
| EP | 1628812 A1 | 3/2006 |
| EP | 1628813 A1 | 3/2006 |
| EP | 2012997 A1 | 1/2009 |
| EP | 2196255 A1 | 6/2010 |
| ES | 2214171 T1 | 9/2004 |
| GB | 2030472 A1 | 4/1980 |
| JP | A-7-148736 | 6/1995 |
| JP | 2001-26019 A | 1/2001 |
| JP | 2001-30244 A | 2/2001 |
| SU | 536062 A1 | 11/1976 |
| UA | UA 1427 U | 10/2002 |
| WO | WO 97/18071 A1 | 5/1997 |
| WO | WO 0181058 A1 * | 11/2001 |
| WO | WO 02/36318 A1 | 5/2002 |
| WO | WO 03/004236 A1 | 1/2003 |
| WO | WO 03/103915 A1 | 12/2003 |
| WO | WO 2004087391 A1 * | 10/2004 ............ B29B 17/00 |
| WO | WO 2004/108379 A1 | 12/2004 |
| WO | WO 2010/118447 A1 | 10/2010 |
| WO | WO 2011/051154 A1 | 5/2011 |

OTHER PUBLICATIONS

International Search Report mailed Feb. 7, 2013, from PCT Application No. PCT/AT2012/050156 (7 pages).
"Recyclinganlage MIT Grosser Flexibilitaet Und Verbesserter Effizienz: High-Flexibility Recycling System with Improved Efficiency," Plastverarbeiter, Huethig GmbH, Heidelberg, DE, vol. 43, No. 10, Oct. 1, 1992, pp. 36-38, XP000310013, ISSN: 0032-1338.
Kowalska B., "Genutete Einzugszonen Konstruktionsvarianten Fuer Einschneckenextruder: Grooved Feed Zones Design Variations for Single-Screw Extruders," Kunstoffe International, Carl Hanser Verlag, Munchen, DE, vol. 90, No. 2, Feb. 1, 2000, pp. 34-36, 38, XP000936826, ISSN: 0023-5563.
Bacher H., "Recycling Von Thermplastischen Primaerabfaellen: Recycling Primary Thermoplastic Waste, "Plasteverbarbeiter, Huethig GmbH, Heidelberg, DE, vol. 46, No. 2, Feb. 1, 1995, pp. 94, 97, & 98, XP000494391, ISSN: 0032-1338.
ASN 14351677. Claims filed Mar. 24, 2015.
ASN 14351869. Claims filed Mar. 11, 2015.

* cited by examiner

APPARATUS FOR THE PRETREATMENT AND SUBSEQUENT CONVEYING, PLASTIFICATION, OR AGGLOMERATION OF PLASTICS

This application is a U.S. National Phase of International Application No. PCT/AT2012/050156, filed Oct. 12, 2012, which claims priority to Austrian Patent Application No. A 1511/2011, filed Oct. 14, 2011, the disclosures of which are incorporated by reference herein.

BACKGROUND

The invention relates to an apparatus for the pretreatment and subsequent conveying, plastification, or agglomeration of plastics.

The prior art reveals numerous similar apparatuses of varying design, comprising a receiver (receiving container) or cutter compactor for the comminution, heating, softening and treatment of a plastics material to be recycled, and also, attached thereto, a conveyor or extruder for the melting of the material thus prepared. The aim here is to obtain a final product of the highest possible quality, mostly in the form of pellets.

By way of example, EP 123 771 or EP 303 929 describe apparatuses with a receiver and, attached thereto, an extruder, where the plastics material introduced into the receiver is comminuted through rotation of the comminution and mixing implements and is fluidized, and is simultaneously heated by the energy introduced. A mixture with sufficiently good thermal homogeneity is thus formed. This mixture is discharged after an appropriate residence time from the receiver into the screw-based extruder, and is conveyed and, during this process, plastified or melted. The arrangement here has the screw-based extruder approximately at the level of the comminution implements. The softened plastics particles are thus actively forced or stuffed into the extruder by the mixing implements.

Most of these designs, which have been known for a long time, are unsatisfactory in respect of the quality of the treated plastics material obtained at the outgoing end of the screw, and/or in respect of the quantitative output of the screw. Studies have shown that the requirements placed upon the screw downstream of the container, mostly a plastifying screw, differ during the course of the operation, and that this is attributable to container residence times that are longer for some batches of the product to be processed than for other batches. The average residence time of the material in the container is calculated by dividing the weight of the charge in the container by the amount discharged from the screw per unit of time. However, this average residence time is—as mentioned—generally not valid for large portions of the material to be processed, but instead there are irregular substantial upward and downward deviations from this average value. These deviations may be attributable to differences in the nature of the batches of product introduced successively into the container, e.g. differences in the nature or thickness of the plastics material, e.g. foil residues, etc., or else uncontrollable events.

For material that is thermally and mechanically homogeneous, there is usually a quality improvement in the product obtained at the outgoing end of the screw when the flight depth of the metering zone of the screw is very large and the screw rotation rate is kept very small. However, if it is desirable to increase the quantitative output of the screw or to improve the performance for example of a shredder-extruder combination, the screw rotation rate must then be raised, and this means that the shear level is also raised. However, this causes the screw to subject the processed material to higher mechanical and thermal stress, and there is therefore the risk of damage to the molecular chains of the plastics material. Another disadvantage that can arise is greater wear of the screw and of its housing, in particular during the processing of recycling material, by virtue of the contaminants present in this material, e.g. abrasive particles, metal parts, etc., which cause severe wear of the metal parts as they slide across one another, in the screw or in its bearings.

However, an effect that occurs both with slow-running and deep-cut screws (large flight depth) and with fast-running screws is that, as previously mentioned, differences in quality of individual batches of material introduced to the screw, e.g. differences in flake size and/or differences in temperature of the plastics material, have a disadvantageous effect with regard to inhomogeneity of the plastics material obtained at the outgoing end of the screw. In order to compensate for this inhomogeneity, the temperature profile of the extruder is in practice raised, and this means that additional energy has to be introduced into the plastic, thus subjecting the plastics material to the thermal damage mentioned and increasing the amount of energy required. Another result here is that the viscosity of the plastics material obtained at the outgoing end of the extruder is reduced, and this makes the material more free-flowing, with concomitant difficulties in the further processing of this material.

It can be seen from this that the process parameters that are advantageous for obtaining material of good quality at the outgoing end of the screw are mutually contradictory.

In an initial attempt to solve this problem, the diameter of the cutter compactor was increased in relation to the diameter of the screw. This enlargement of the container in comparison with conventional sizes improved the mechanical and thermal homogeneity of the plastics material pretreated in the container. The reason for this was that the ratio by mass of the continuously added untreated "cold" portions of material to the amount of material present in the container and already to some extent treated was smaller than under the conditions that usually prevail, and that the average residence time of the plastics material in the container was substantially increased. This reduction of the ratio by mass had an advantageous effect on the thermal and mechanical homogeneity of the material entering the screw housing from the container, and with this had a direct advantageous effect on the quality of the plastified or agglomerated material at the end of the extruder screw or of the agglomerating screw, since the product initially introduced to the screw was at least approximately of identical mechanical and thermal homogeneity, and therefore the screw itself was not required to achieve this homogeneity. The theoretical residence time of the treated plastics material in the container was approximately constant. Furthermore, this type of system with enlarged container was less sensitive than the known systems in relation to the accuracy of input portions.

Systems of this type were therefore in principle capable of effective use, and advantageous. However, although systems using containers or cutter compactors with large diameters, e.g. of 1500 mm or more, and with relatively long residence times, have good functionality, and although the quality of the recylate is high, they are not ideal in terms of space required and of efficiency, or they emit a large amount of heat.

Another feature shared by these known apparatuses is that the direction of conveying or of rotation of the mixing and comminution implements, and therefore the direction in which the particles of material circulate in the receiver, and the direction of conveying of the conveyor, in particular of an extruder, are in essence identical or have the same sense. This arrangement, selected intentionally, was the result of the desire to maximize stuffing of the material into the screw, or to force-feed the screw. This concept of stuffing the particles into the conveying screw or extruder screw in the direction of conveying of the screw was also very obvious and was in line with the familiar thinking of the person skilled in the art, since it means that the particles do not have to reverse their direction of movement and there is therefore no need to exert any additional force for the change of direction. An objective here, and in further derivative developments, was always to maximize screw fill and to amplify this stuffing effect. By way of example, attempts have also been made to extend the intake region of the extruder in the manner of a cone or to curve the comminution implements in the shape of a sickle, so that these can act like a trowel in feeding the softened material into the screw. Displacement of the extruder, on the inflow side, from a radial position to a tangential position in relation to the container further amplified the stuffing effect, and increased the force with which the plastics material from the circulating implement was conveyed or forced into the extruder.

Apparatuses of this type are in principle capable of functioning, and they operate satisfactorily, although with recurring problems:

By way of example, an effect repeatedly observed with materials with low energy content, e.g. PET fibres or PET foils, or with materials which at a low temperature become sticky or soft, e.g. polylactic acid (PLA) is that when, intentionally, stuffing of the plastics material into the intake region of the extruder or conveyor, under pressure, is achieved by components moving in the same sense, this leads to premature melting of the material immediately after, or else in, the intake region of the extruder or of the screw. This firstly reduces the conveying effect of the screw, and secondly there can also be some reverse flow of this melt into the region of the cutter compactor or receiver, with the result that flakes that have not yet melted adhere to the melt, and in turn the melt thus cools and to some extent solidifies, with resultant formation of a clump or conglomerate made of to some extent solidified melt and of solid plastics particles. This causes blockage on the intake and caking of the mixing and comminution implements. A further consequence is reduction of the throughput or quantitative output of the conveyor or extruder, since adequate filling of the screw is no longer achieved. Another possibility here is that movement of the mixing and comminution implements is prevented. In such cases, the system normally has to be shut down and thoroughly cleaned.

Problems also occur with polymer materials which have already been heated in the cutter compactor up to the vicinity of their melting range. If overfilling of the intake region occurs here, the material melts and intake is impaired.

Problems are also encountered with fibrous materials that are mostly orientated and linear, with a certain amount of longitudinal elongation and low thickness or stiffness, for example plastics foils cut into strips. A main reason for this is that the elongate material is retained at the outflow end of the intake aperture of the screw, where one end of the strip protrudes into the receiver and the other end protrudes into the intake region. Since the mixing implements and the screw are moving in the same sense or exert the same conveying-direction component and pressure component on the material, both ends of the strip are subjected to tension and pressure in the same direction, and release of the strip becomes impossible. This in turn leads to accumulation of the material in the said region, to a narrowing of the cross section of the intake aperture, and to poorer intake performance and, as a further consequence, to reduced throughput. The increased feed pressure in this region can moreover cause melting, and this in turn causes the problems mentioned in the introduction. Another problem is efficient and non-aggressive introduction of the material into the screw while avoiding blockages, and achieving greater intensity of treatment of the material in the container.

SUMMARY

It is therefore an object of the present invention to overcome the disadvantages mentioned and to improve an apparatus of the type described in the introduction in such a way as to permit problem-free intake of materials by the screw, even of those that are sensitive or strip-shaped, and to permit processing or treatment of these materials to give material of high quality, with high throughput, while making efficient use of time, saving energy, and minimizing space requirement.

The characterizing features of certain embodiments achieve this object in an apparatus of the type mentioned in the introduction.

A first provision here is that the imaginary continuation of the central longitudinal axis of the conveyor, in particular extruder, if this has only a single screw, or the longitudinal axis of the screw closest to the intake aperture, if the conveyor has more than one screw, in a direction opposite to the direction of conveying of the conveyor, passes, and does not intersect, the axis of rotation, where, on the outflow side, there is an offset distance between the longitudinal axis of the conveyor, if this has a single screw, or the longitudinal axis of the screw closest to the intake aperture, and the radial that is associated with the container and that is parallel to the longitudinal axis and that proceeds outwards from the axis of rotation of the mixing and/or comminution implement in the direction of conveying of the conveyor.

The direction of conveying of the mixing implements and the direction of conveying of the conveyor are therefore no longer in the same sense, as is known from the prior art, but instead are at least to a small extent in the opposite sense, and the stuffing effect mentioned in the introduction is thus reduced. The intentional reversal of the direction of rotation of the mixing and comminution implements in comparison with apparatuses known hitherto reduces the feed pressure on the intake region, and the risk of overfilling decreases. In this way, excess material is not stuffed or trowelled with excess pressure into the intake region of the conveyor, but instead, in contrast, there is in fact in turn a tendency to remove excess material from that region, in such a way that although there is always sufficient material present in the intake region, the additional pressure exerted is small or almost zero. This method can provide adequate filling of the screw and constant intake of sufficient material by the screw, without any overfilling of the screw with, as a further consequence, local pressure peaks where the material could melt.

Melting of the material in the region of the intake is thus prevented, and operating efficiency is therefore increased, maintenance intervals are therefore lengthened, and downtime due to possible repairs and cleaning measures is reduced.

By virtue of the reduced feed pressure, displaceable elements which can be used in a known manner to regulate the degree of filling of the screw react markedly more sensitively, and the degree of filling of the screw can be adjusted with even greater precision. This makes it easier to find the ideal point at which to operate the system, in particular for relatively heavy materials, for example regrind made of high-density polyethylene (HDPE) or PET.

Surprisingly and advantageously it has moreover been found that operation in the opposite sense, according to the invention, improves intake of materials which have already been softened almost to the point of melting. In particular when the material is already in a doughy or softened condition, the screw cuts the material from the doughy ring adjacent to the container wall. In the case of a direction of rotation in the direction of conveying of the screw, this ring would instead be pushed onward, and removal of an outer layer by the screw would not be possible, with resultant impairment of intake. The reversal of the direction of rotation, according to the invention, avoids this.

Furthermore, the retention or accumulation phenomena formed in the case of the treatment of the above-described strip-shaped or fibrous materials can be resolved more easily, or do not occur at all, since, at the aperture edge situated in the direction of rotation of the mixing implements on the outflow side or downstream, the direction vector for the mixing implements and the direction vector for the conveyor point in almost opposite directions, or in directions that at least to a small extent have opposite sense, and an elongate strip cannot therefore become curved around, and retained by, the said edge, but instead becomes entrained again by the mixing vortex in the receiver.

A factor that assists this behaviour of the apparatus is that, on the internal wall area of the container, there is at least one bar-shaped deflector which is directed into the interior of the container, and the height profile of which decreases in the direction of rotation of the mixing implement, seen from above, and the angle included thereby, over its length, with a plane perpendicular to the axis of rotation of the mixing implements is an acute angle.

The overall effect of the design according to the invention is that intake performance is improved and throughput is markedly increased. The stability and performance of the entire system made of cutter compactor and conveyor is thus increased.

The effect of this specific design of a cutter-compactor/conveyor system is that—contrary to previous expectations—it is also possible to use containers or cutter compactors with relatively small diameters, and that it is possible to achieve high throughput performance levels and high quantitative output even with low residence time.

Because of the opposite direction of rotation of the mixing implements, the intake behaviour of the screw is not aggressive, and it is therefore possible, in the cutter compactor, to use implements that are more aggressive and that introduce more energy into the material. This also reduces the average residence time of the material in the cutter compactor. Accordingly, the cutter compactor can be operated at relatively high temperature, a consequence of which is in turn better homogeneity. Containers with relatively small diameters and residence times can therefore also be used successfully to prepare the material.

Another unexpected consequence of this type of combination of cutter compactor and extruder is improved introduction and melting performance of the material in an attached extruder. This provides compensation for possible inhomogeneity, and the material that passes from the container into the screw housing and is then compressed and melted has high thermal and mechanical homogeneity. The final quality of the plastified or agglomerated material at the end of the extruder screw or of the agglomerating screw is correspondingly also very high, and it is possible to use screws which, because of the pretreatment and the intake, treat the polymer in a non-aggressive manner and introduce a particularly small amount of shear into the material in order to melt the same. The extent of possible blockages of the intake aperture is reduced. Irrespective of the direction of rotation of the screw, the introduction of material into the screw of assisted, and the performance of the implements in the stuffing and introduction procedure is improved.

So as to be able to achieve adaptation appropriate for various materials and fill volumes, it is possible according to the invention that the angle is constant at least in sections over the length of the deflector, or that the profile of the deflector is curved, in particular curved downwards, at least over a section of its length, and in that case the angle represents the tangential angle present at the respective point on the deflector, and/or that the angle in particular in the central region of the deflector, is from 15° to 45°, preferably from 20° to 40°, and/or that the angle decreases towards the lower end of the deflector, optionally to an angle $\alpha=0°$.

To assist the intake performance of the screw and the introduction of material into the intake aperture, it has proved advantageous if the lower end of the deflector is within a circumferential region of the container between the two lateral edges of the intake aperture, and this region is optionally enlarged in the direction of rotation of the implements by at most from 50% to 80% of the length of a longitudinal edge, and/or if the lower end of the deflector is at a height level on the container wall, where this level is within the region between the upper and lower longitudinal edge of the intake aperture and optionally at most from 50% to 80% of the height of the intake aperture above the upper longitudinal edge or at most from 20% to 30% of the height of the intake aperture below the lower edge of the intake aperture, and/or if the upper end of the deflector, viewed in the direction of rotation of the mixing implements, is at least 10° to 15°, preferably 30° to 55°, prior to that edge that is associated with the intake aperture and that is situated upstream in the direction of rotation, or after that edge that is associated with the intake aperture and that is situated downstream in the direction of rotation.

It is possible that the bar-shaped deflector has a rectangular cross section optionally rounded at the edges projecting into the container, and is secured by its narrow side on the internal wall of the container. Deflectors having rectangular cross section are especially attached on the internal wall of the container in a manner such that they protrude radially from the internal wall of the container.

The width and length of the stripping elements can be adapted to be appropriate to the nature of the materials and treatment thereof, and the desired introduction behaviour. It is also possible that the width of the deflector increases in the direction towards the end or, optionally in stages, decreases.

It is advantageous if the width of the deflector is in the range from 1% to 10% of the diameter of the container.

In the case of a specific formation of a deflector, it is possible that the lower end representing the lowest section of the deflector is followed by an extension, which is directed upwards in the direction of rotation, in particular as a single piece. It is thus possible in particular to improve the flow of material downstream of the intake aperture in the direction of rotation.

It has been found to be beneficial for intake performance if the deflector ends outside of the open cross section of the intake aperture.

Other advantageous embodiments of the invention are described via the following features:

Operation of the apparatus is particularly advantageous when the constant K is in the range from 90 to 170. At these K values, or at the container sizes and residence times associated therewith, the implement transfers the material particularly effectively to the conveyor, and there is a particularly good balance between the other features that are to some extent negatively correlated: the container size, the residence time, the intake behaviour or the throughput, and the quality of the final product.

According to one advantageous development of the invention, it is envisaged that the conveyor is arranged on the receiver in such a way that the scalar product of the direction vector (direction vector that is associated with the direction of rotation) that is tangential to the circle described by the radially outermost point of the mixing and/or comminution implement or to the plastics material transported past the aperture and that is normal to a radial of the receiver, and that points in the direction of rotation or of movement of the mixing and/or comminution implement and of the direction vector that is associated with the direction of conveying of the conveyor at each individual point or in the entire region of the aperture or at each individual point or in the entire region immediately radially prior to the aperture is zero or negative. The region immediately radially prior to the aperture is defined as that region which is prior to the aperture and at which the material is just about to pass through the aperture but has not yet passed the aperture. The advantages mentioned in the introduction are thus achieved, and there is effective avoidance of all types of agglomeration in the region of the intake aperture, brought about by stuffing effects. In particular here, there is also no dependency on the spatial arrangement of the mixing implements and of the screw in relation to one another, and by way of example the orientation of the axis of rotation does not have to be normal to the basal surface or to the longitudinal axis of the conveyor or of the screw. The direction vector that is associated with the direction of rotation and the direction vector that is associated with the direction of conveying lie within a, preferably horizontal, plane, or in a plane orientated so as to be normal to the axis of rotation.

In another advantageous embodiment, the angle included between the direction vector that is associated with the direction of rotation of the mixing and/or comminution implement and the direction vector that is associated with the direction of conveying of the conveyor is greater than or equal to 90° and smaller than or equal to 180°, where the angle is measured at the point of intersection of the two direction vectors at the edge that is associated with the aperture and that is situated upstream in relation to the direction of rotation or of movement, in particular at the point that is on the said edge or on the aperture and is situated furthest upstream. This therefore describes the range of angles within which the conveyor must be arranged on the receiver in order to achieve the advantageous effects. In the entire region of the aperture or at each individual point of the aperture, the forces acting on the material are therefore orientated at least to a small extent in an opposite sense, or in the extreme case the orientation is perpendicular and pressure-neutral. At no point of the aperture is the scalar product of the direction vectors of the mixing implements and of the screw positive, and no excessive stuffing effect occurs even in a subregion of the aperture.

Another advantageous embodiment of the invention provides that the angle included between the direction vector that is associated with the direction of rotation or of movement and the direction vector that is associated with the direction of conveying is from 170° to 180°, measured at the point of intersection of the two direction vectors in the middle of the aperture. This type of arrangement is relevant by way of example when the conveyor is arranged tangentially on the cutter compactor.

In order to ensure that no excessive stuffing effect occurs, the distance, or the offset, between the longitudinal axis and the radial can advantageously be greater than or equal to half of the internal diameter of the housing of the conveyor or of the screw.

It can moreover be advantageous for these purposes to set the distance, or the offset, between the longitudinal axis and the radial to be greater than or equal to 5 or 7%, or still more advantageously greater than or equal to 20%, of the radius of the receiver. In the case of conveyors with a prolonged intake region or with grooved bushing or with extended hopper, it can be advantageous for this distance or the said offset to be greater than or equal to the radius of the receiver. This is particularly true for cases where the conveyor is attached tangentially to the receiver or runs tangentially to the cross section of the container.

It is advantageous that the outermost flights of the screw do not protrude into the container.

It is particularly advantageous if the longitudinal axis of the conveyor or of the screw or the longitudinal axis of the screw closest to the intake aperture runs tangentially with respect to the inner side of the side wall of the container, or the inner wall of the housing does so, or the enveloping end of the screw does so, where it is preferable that there is a drive connected to the end of the screw, and that the screw provides conveying, at its opposite end, to a discharge aperture which is in particular an extruder head and which is arranged at the end of the housing.

In the case of conveyors that are radially offset, but not arranged tangentially, it is advantageous to provide that the imaginary continuation of the longitudinal axis of the conveyor in a direction opposite to the direction of conveying, at least in sections, passes, in the form of a secant, through the space within the receiver.

It is advantageous to provide that there is immediate and direct connection between the aperture and the intake aperture, without substantial separation or a transfer section, e.g. a conveying screw. This permits effective and non-aggressive transfer of material.

The reversal of the direction of rotation of the mixing and comminution implements circulating in the container can certainly not result from arbitrary action or negligence, and it is not possible—either in the known apparatuses or in the apparatus according to the invention—simply to allow the mixing implements to rotate in the opposite direction, in particular because the arrangement of the mixing and comminution implements is in a certain way asymmetrical or direction-oriented, and their action is therefore only single-sided or unidirectional. If this type of equipment were to be rotated intentionally in the wrong direction, a good mixing vortex would not form, and there would be no adequate comminution or heating of the material. Each cutter compactor therefore has its unalterably prescribed direction of rotation of the mixing and comminution implements.

In this connection, it is particularly advantageous to provide that the manner of formation, set-up, curvature and/or arrangement of the frontal regions or frontal edges that are associated with the mixing and/or comminution implements, act on the plastics material and point in the direction of rotation or of movement, differs when comparison is made with the regions that, in the direction of rotation or of movement, are at the rear or behind.

An advantageous arrangement here provides that, on the mixing and/or comminution implement, implements and/or blades have been arranged which, in the direction of rotation or of movement, have a heating, comminuting and/or cutting effect on the plastics material. The implements and/or blades can either be fastened directly on the shaft or preferably be arranged on a rotatable implement carrier or, respectively, a carrier disc arranged in particular parallel to the basal surface, or be formed therein or moulded onto the same, optionally as a single piece.

In principle, the effects mentioned are relevant not only to compressing extruders or agglomerators but also to conveying screws that have no, or less, compressing effect. Here again, local overfeed is avoided.

In another particularly advantageous embodiment, it is provided that the receiver is substantially cylindrical with a level basal surface and with, orientated vertically in relation thereto, a side wall which has the shape of the jacket of a cylinder. In another simple design, the axis of rotation coincides with the central axis of the receiver. In another advantageous formation, the axis of rotation or the central axis of the container have been orientated vertically and/or normally in relation to the basal surface. These particular geometries optimize intake performance, with an apparatus design that provides stability and simple construction.

In this connection it is also advantageous to provide that the mixing and/or comminution implement or, if a plurality of mutually superposed mixing and/or comminution implements have been provided, the lowest mixing and/or comminution implement closest to the base is arranged at a small distance from the basal surface, in particular in the region of the lowest quarter of the height of the receiver, and also that the aperture is similarly arranged. The distance here is defined and measured from the lowest edge of the aperture or of the intake aperture to the container base in the edge region of the container. There is mostly some rounding of the edge at the corner, and the distance is therefore measured from the lowest edge of the aperture along the imaginary continuations of the side wall downwards to the imaginary outward continuation of the container base. Distances with good suitability are from 10 to 400 mm.

In another advantageous embodiment of the treatment process, the radially outermost edges of the mixing and/or comminution implements almost reach the side wall.

In a particularly advantageous embodiment, in this connection, the distance A of the radially outermost point of the lowest mixing and/or comminution implement, or the distance A of the circle described by this point, from the inner surface of the side wall of the container, is greater than or equal to 20 mm, in particular from ≥20 mm to 60 mm. This gives particularly effective and non-aggressive intake behaviour.

The container does not necessarily have to have a cylindrical shape with circular cross section, even though this shape is advantageous for practical reasons and reasons of manufacturing technology. When container shapes that deviate from the cylindrical shape with circular cross section, examples being containers having the shape of a truncated cone or cylindrical containers which, in plan view, are elliptical or oval, a calculation is required for conversion to a cylindrical container which has circular cross section and the same volume capacity, on the assumption that the height of this imaginary container is the same as its diameter. Container heights here which are substantially higher than the resultant mixing vortex (after taking into account the distance required for safety) are ignored, since this excess container height is not utilized and it therefore has no further effect on the processing of the material.

The expression conveyor means mainly systems with screws that have non-compressing or decompressing effect, i.e. screws which have purely conveying effect, but also systems with screws that have compressing effect, i.e. extruder screws with agglomerating or plastifying effect.

The expressions extruder and extruder screw in the present text mean extruders or screws used for complete or partial melting of the material, and also extruders used to agglomerate, but not melt, the softened material. Screws with agglomerating effect subject the material to severe compression and shear only for a short time, but do not plastify the material. The outgoing end of the agglomerating screw therefore delivers material which has not been completely melted but which instead is composed of particles incipiently melted only at their surface, which have been caked together as if by sintering. However, in both cases the screw exerts pressure on the material and compacts the same.

All of the examples described in the figure below depict conveyors with a single screw, for example single-screw extruders. However, it is also possible as an alternative to provide conveyors with more than one screw, for example twin- or multiscrew conveyors or twin- or multiscrew extruders, in particular with a plurality of identical screws, which at least have the same diameters d.

BRIEF DESCRIPTION OF THE DRAWINGS

Further features and advantages of the invention are apparent from the description of the inventive examples below of the subject matter of the invention, which are not to be interpreted as restricting, and which the drawings depict diagrammatically and not to scale.

Figure 1:
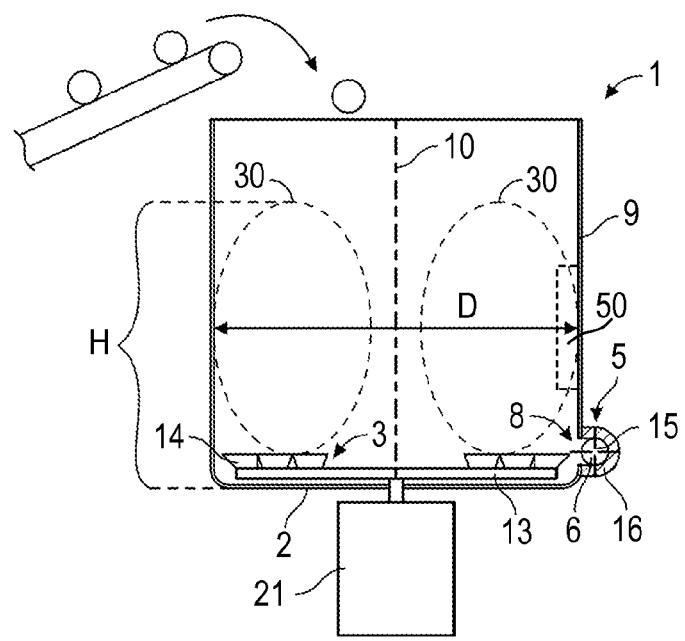
FIG. 1 shows a vertical section through an apparatus according to the invention with extruder attached approximately tangentially.
Figure 3:
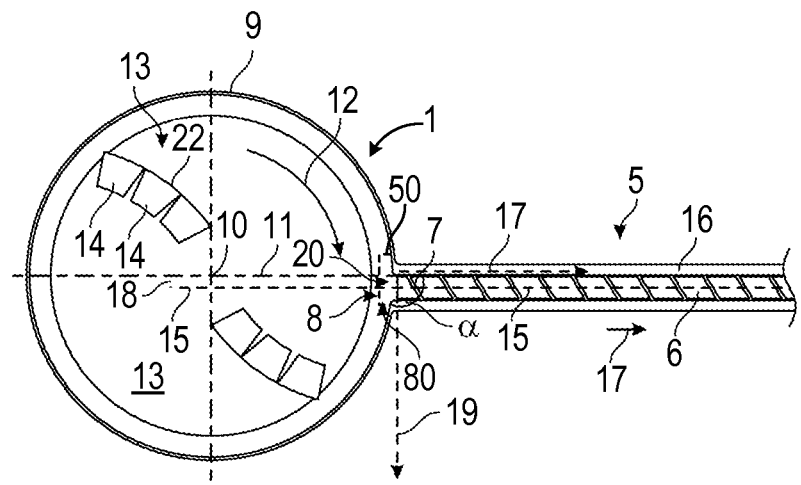
FIG. 3 shows another embodiment with minimal offset.
Figure 4:
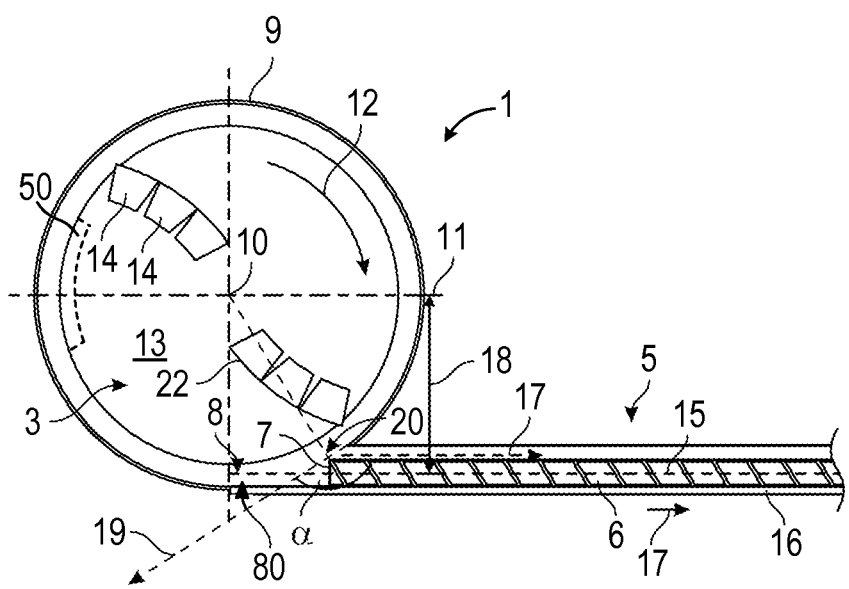
FIG. 4 shows another embodiment with relatively large offset.

For reasons of clarity, FIGS. 1, 3 and 4 provide only an indication of the deflectors.

Neither the containers, nor the screws nor the mixing implements are to scale, either themselves or in relation to one another, in the drawings. By way of example, therefore, the containers are in reality mostly larger, or the screws longer, than depicted here.

DETAILED DESCRIPTION

Figure 2:
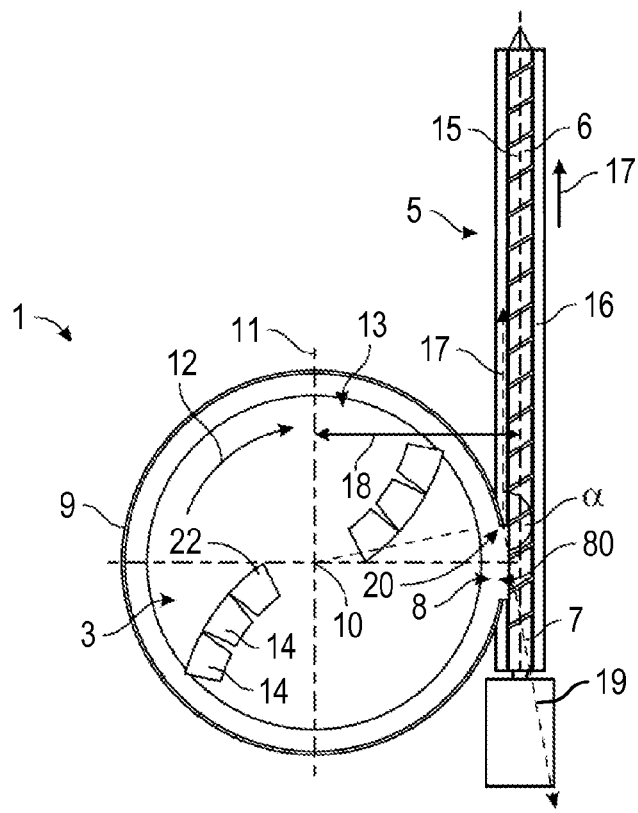
FIG. 2 shows a horizontal section through the embodiment of FIG. 1.

The advantageous cutter-compactor/extruder combination depicted in FIG. 1 and FIG. 2 for the treatment or recycling of plastics material has a cylindrical container or cutter compactor or shredder 1 with circular cross section, with a level, horizontal basal surface 2 and with a vertical side wall 9 oriented normally thereto with the shape of a cylinder jacket.

Arranged at a small distance from the basal surface 2, at most at about 10 to 20%, or optionally less, of the height of the side wall 9—measured from the basal surface 2 to the uppermost edge of the side wall 9—is an implement carrier 13 or a level carrier disc orientated parallel to the basal surface 2, which carrier or disc can be rotated, in the direction 12 of rotation or of movement indicated by an arrow 12, around a central axis 10 of rotation, which is simultaneously the central axis of the container 1. A motor 21, located below the container 1, drives the carrier disc 13. On the upper side of the carrier disc 13, blades or implements, e.g. cutter blades, 14 have been arranged, and together with the carrier disc 13 form the mixing and/or comminution implement 3.

As indicated in the diagram, the blades 14 are not arranged symmetrically on the carrier disc 13, but instead have a particular manner of formation, set-up or arrangement on their frontal edges 22 facing in the direction 12 of rotation or of movement, so that they can have a specific mechanical effect on the plastics material. The radially outermost edges of the mixing and comminution implements 3 reach a point which is relatively close to, about 5% of the radius 11 of the container 1 from, the inner surface of the side wall 9.

The container 1 has, near the top, a charging aperture through which the product to be processed, e.g. portions of plastics foils, is charged by way of example by means of a conveying device in the direction of the arrow. The container 1 can, as an alternative, be a closed container and capable of evacuation at least as far as an industrial vacuum, the material being introduced by way of a system of valves. The said product is received by the circulating mixing and/or comminution implements 3 and is raised to form a mixing vortex 30, where the product rises along the vertical side wall 9 and, approximately in the region of the effective container height H, falls back again inward and downward into the region of the centre of the container, under gravity. The effective height H of the container 1 is approximately the same as its internal diameter D. In the container 1, a mixing vortex 30 is thus formed, in which the material is circulated in a vortex both from top to bottom and also in the direction 12 of rotation. By virtue of this particular arrangement of the mixing and comminution elements 3 or the blades 14, this type of apparatus can therefore be operated only with the prescribed direction 12 of rotation or movement, and the direction 12 of rotation cannot be reversed readily or without additional changes.

The circulating mixing and comminution implements 3 comminute and mix the plastics material introduced, and thereby heat and soften it by way of the mechanical frictional energy introduced, but do not melt it. After a certain residence time in the container 1, the homogenized, softened, doughy but not molten material is, as described in detail below, removed from the container 1 through an aperture 8, passed into the intake region of an extruder 5, and received by a screw 6 there and subsequently melted.

At the level of the, in the present case single, comminution and mixing implement 3, the said aperture 8 is formed in the side wall 9 of the container 1, and the pretreated plastics material can be removed from the interior of the container 1 through this aperture. The material is passed to a single-screw extruder 5 arranged tangentially on the container 1, where the housing 16 of the extruder 5 has, situated in its jacket wall, an intake aperture 80 for the material to be received by the screw 6. This type of embodiment has the advantage that the screw 6 can be driven from the lower end in the drawing by a drive, depicted only diagrammatically, in such a way that the upper end of the screw 6 in the drawing can be kept free from the drive. The discharge aperture for the plastified or agglomerated plastics material conveyed by the screw 6 can therefore be arranged at this upper end, e.g. in the form of an extruder head not depicted. The plastics material can therefore be conveyed without deflection by the screw 6 through the discharge aperture; this is not readily possible in the embodiments according to FIGS. 3 and 4.

There is connection for conveying of material or for transfer of material between the intake aperture 80 and the aperture 8, and in the present case this connection to the aperture 8 is direct and immediate and involves no prolonged intervening section and no separation. All that is provided is a very short transfer region.

In the housing 16, there is a screw 6 with compressing effect, mounted rotatably around its longitudinal axis 15. The longitudinal axis 15 of the screw 6 and that of the extruder 5 coincide. The extruder 5 conveys the material in the direction of the arrow 17. The extruder 5 is a conventional extruder known per se in which the softened plastics material is compressed and thus melted, and the melt is then discharged at the opposite end, at the extruder head.

The mixing and/or comminution implements 3 or the blades 14 are at approximately the same level as the central longitudinal axis 15 of the extruder 5. The outermost ends of the blades 14 have adequate separation from the flights of the screw 6.

In the embodiment according to FIGS. 1 and 2, the extruder 5 is, as mentioned, attached tangentially to the container 1, or runs tangentially in relation to its cross section. In the drawing, the imaginary continuation of the central longitudinal axis 15 of the extruder 5 or of the screw 6 in a direction opposite to the direction 17 of conveying of the extruder 5 towards the rear passes the axis 10 of rotation and does not intersect the same. On the outflow side, there is an offset distance 18 between the longitudinal axis 15 of the extruder 5 or of the screw 6 and the radius 11 that is associated with the container 1 and that is parallel to the longitudinal axis 15 and that proceeds outwards from the axis 10 of rotation of the mixing and/or comminution implement 3 in the direction 17 of conveyance of the conveyor 5. In the present case, the imaginary continuation of the longitudinal axis 15 of the extruder 5 towards the rear does not pass through the space within the container 1, but instead passes the same at a short distance therefrom.

The distance 18 is somewhat greater than the radius of the container 1. There is therefore a slight outward offset of the extruder 5, or the intake region is somewhat deeper.

The expressions "opposite", "counter-" and "in an opposite sense" here mean any orientation of the vectors with respect to one another which is not acute-angled, as explained in detail below.

In other words, the scalar product of a direction vector 19 which is associated with the direction 12 of rotation and the orientation of which is tangential to the circle described by the outermost point of the mixing and/or comminution implement 3 or tangential to the plastics material passing the aperture 8, and which points in the direction 12 of rotation or movement of the mixing and/or comminution implements 3, and of a direction vector 17 which is associated with the direction of conveying of the extruder 5 and which proceeds in the direction of conveying parallel to the central longitudinal axis 15 is everywhere zero or negative, at each individual point of the aperture 8 or in the region radially immediately prior to the aperture 8, and is nowhere positive.

In the case of the intake aperture in FIGS. 1 and 2, the scalar product of the direction vector 19 for the direction 12 of rotation and of the direction vector 17 for the direction of conveying is negative at every point of the aperture 8.

The angle $\alpha$ between the direction vector 17 for the direction of conveying and the direction vector for the direction 19 of rotation, measured at the point 20 that is associated with the aperture 8 and situated furthest upstream in relation to the direction 12 of rotation, or at the edge associated with the aperture 8 and situated furthest upstream, is approximately maximally about 170°.

As one continues to proceed downwards along the aperture 8 in FIG. 2, i.e. in the direction 12 of rotation, the oblique angle between the two direction vectors continues to increase. In the centre of the aperture 8, the angle between the direction vectors is about 180° and the scalar product is maximally negative, and further downwards from there the angle indeed becomes >180° and the scalar product in turn decreases, but still remains negative. However, these angles are no longer termed angles α, since they are not measured at point 20.

An angle β, not included in the drawing in FIG. 2, measured in the centre of the aperture 8, between the direction vector for the direction 19 of rotation and the direction vector for the direction 17 of conveying is about 178° to 180°.

The apparatus according to FIG. 2 represents the first limiting case or extreme value. This type of arrangement can provide a very non-aggressive stuffing effect or a particularly advantageous feed, and this type of apparatus is particularly advantageous for sensitive materials which are treated in the vicinity of the melting range, or for product in the form of long strips.

FIG. 3 shows an alternative embodiment in which the extruder 5 is not attached tangentially to the container 1 but instead is attached by its end 7. The screw 6 and the housing 16 of the extruder 5 have been adapted in the region of the aperture 8 to the shape of the inner wall of the container 1, and have been offset backwards so as to be flush. No part of the extruder 5 protrudes through the aperture 8 into the space within the container 1.

The distance 18 here corresponds to about 5 to 10% of the radius 11 of the container 1 and to about half of the internal diameter d of the housing 16. This embodiment therefore represents the second limiting case or extreme value with the smallest possible offset or distance 18, where the direction 12 of rotation or of movement of the mixing and/or comminution implements 3 is at least slightly opposite to the direction 17 of conveying of the extruder 5, and specifically across the entire area of the aperture 8.

The scalar product in FIG. 3 at that threshold point 20 situated furthest upstream is precisely zero, where this is the point located at the edge 20' that is associated with the aperture 8 and situated furthest upstream. The angle α between the direction vector 17 for the direction of conveying and the direction vector for the direction 19 of rotation, measured at point 20 in FIG. 3, is precisely 90°. If one proceeds further downwards along the aperture 8, i.e. in the direction 12 of rotation, the angle between the direction vectors becomes ever greater and becomes an oblique angle >90°, and at the same time the scalar product becomes negative. However, at no point, or in no region of the aperture 8 is the scalar product positive, or the angle smaller than 90°. No local overfeed can therefore occur even in a subregion of the aperture 8, and no detrimental excessive stuffing effect can occur in a region of the aperture 8.

This also represents a decisive difference in relation to a purely radial arrangement, since there would be an angle α<90° at point 20 or at the edge 20' in a fully radial arrangement of the extruder 5, and those regions of the aperture 8 situated, in the drawing, above the radial 11 or upstream thereof or on the inflow side thereof would have a positive scalar product. It would thus be possible for locally melted plastics product to accumulate in these regions.

FIG. 4 depicts another alternative embodiment in which the extruder 5 is somewhat further offset than in FIG. 3 on the outflow side, but still not tangentially as in FIGS. 1 and 2. In the present case, as also in FIG. 3, the rearward imaginary continuation of the longitudinal axis 15 of the extruder 5 passes through the space within the container 1 in the manner of a secant. As a consequence of this, the aperture 8 is—measured in the circumferential direction of the container 1—wider than in the embodiment according to FIG. 3. The distance 18 is also correspondingly greater than in FIG. 3, but somewhat smaller than the radius 11. The angle α measured at point 20 is about 150°, and the stuffing effect is therefore reduced in comparison with the apparatus of FIG. 3; this is more advantageous for certain sensitive polymers. The inner wall of the housing 16 or the right-hand-side inner edge, as seen from the container 1, is tangential to the container 1, and therefore, unlike in FIG. 3, there is no oblique transitional edge. At this point that is associated with the aperture 8 and is furthest downstream, on the extreme left-hand side in FIG. 4, the angle is about 180°.

In order, in all these container-extruder combinations, to achieve ideal conditions in respect of the residence times of the plastic for the precomminution process, the predrying process and the preheating process for the plastics material in the container 1, the diameter D of the container 1 has the following relationship to the external diameter d of the screw 6: D=10.

$$D = 10 \cdot \sqrt[3]{K \cdot d^2},$$

where D is the internal diameter in millimetres of the container 1, d is the diameter in millimetres of the screw 6 and K is a constant, this constant being in the range from 60 to 180.

As mentioned in the introduction, the specific ratio between the internal diameter D of the container 1 and the average diameter d of the screw 6 ensures that, with a relatively low average residence time of the material, product of adequately constant thermal and mechanical nature is always passed into the intake aperture 80 of the housing 16, even when the product to be processed is difficult for this type of processing, an example being foil residues of differing nature (thickness, size, etc.). The mixing or comminution implements 3 provide, by virtue of their particular direction 12 of rotation relative to the direction of conveying of the screw 6, non-aggressive intake of the material into the extruder 5, and ensure that it is possible to achieve a homogeneous melt at high throughput. The deflectors 50 provided assist the implements 3. The selected direction 12 of rotation of the mixing or comminution implements 3 acts synergistically with the addition of the deflectors 50. Deflectors 50 of this type are attached on the internal wall of the container 1, for example attached by welding. The deflectors 50 have a prescribed length l, and also a prescribed width b, which can be adapted to be appropriate to the respective conditions. In principle, the deflectors 50 can also be attached exchangeably on the internal wall of the container. The number of the deflectors 50 arranged along the internal wall of the container 1 is adapted to be appropriate to the intended use of the apparatus.

Figure 5:
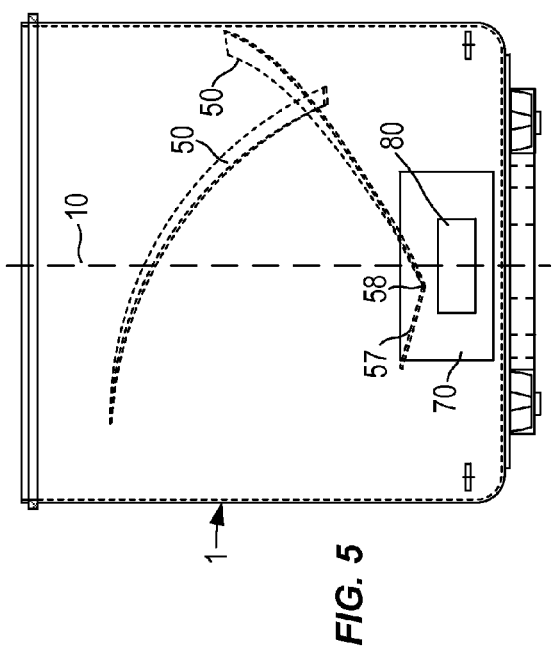
FIGS. 5 and 6 show a container with deflectors.

FIG. 5 is a diagram of a section through a container 1 in which there are two deflectors 50 arranged on opposite regions of internal wall. One of the deflectors 50 is opposite to the intake aperture 80; the other deflector, which has an extension 57 at its end, has a lower end region or a lower end 58 which is above the intake aperture 80. At 70, a surrounding area, or a region around the intake aperture 80, is depicted, within which the end or the lowest point 58 of at least one of the stripping elements 50 provided should preferably be been arranged.

Figure 6:
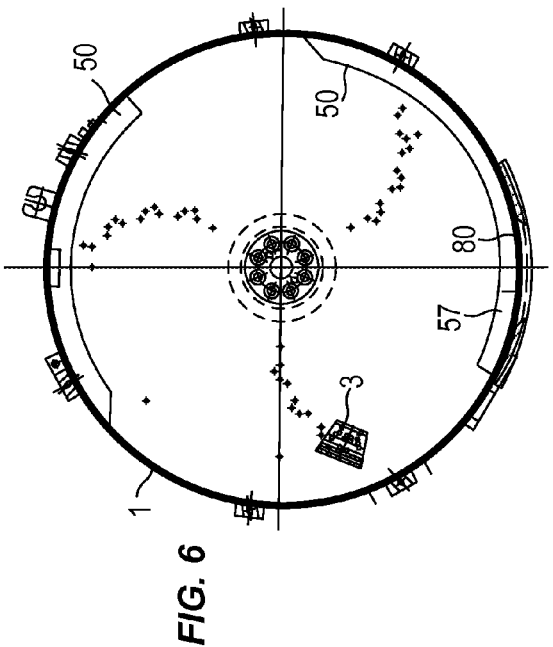

FIG. 6 is a plan view of the container depicted in FIG. 5. The two deflectors 50 are seen, arranged on mutually opposite internal wall areas.

Figure 7:
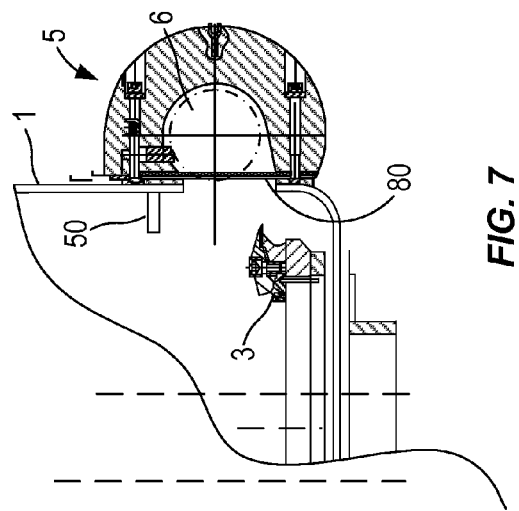
FIG. 7 shows a detail.

FIG. 7 shows a detailed section of the connection of a conveyor screw or extruder screw 6 to the container 1. Above the intake aperture 80 there is a deflector 50. This bar-shaped deflector 50 is secured by its narrow side on the container wall, and protrudes into the interior of the container.

Figure 8:
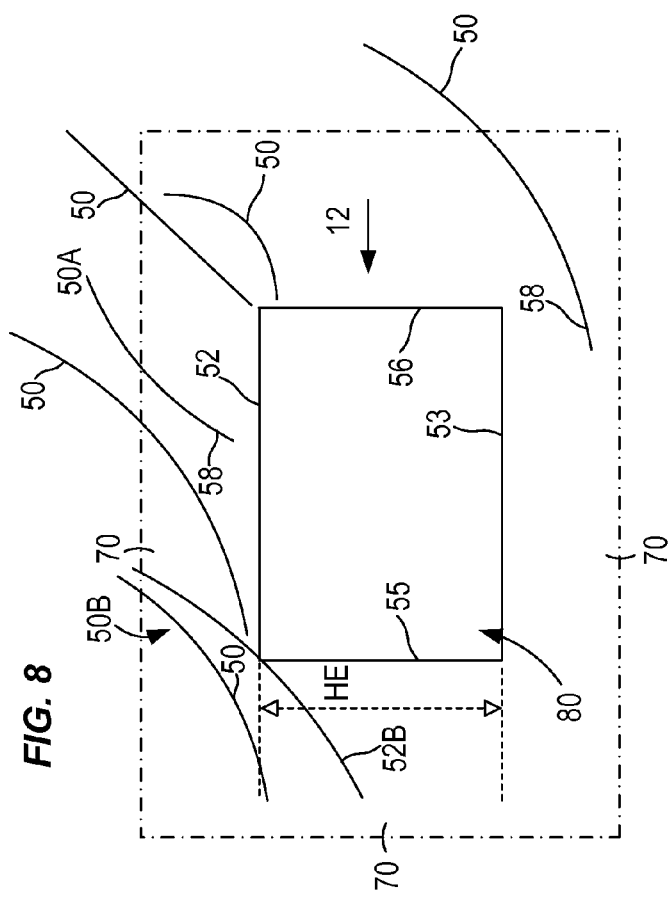
Figure 9:
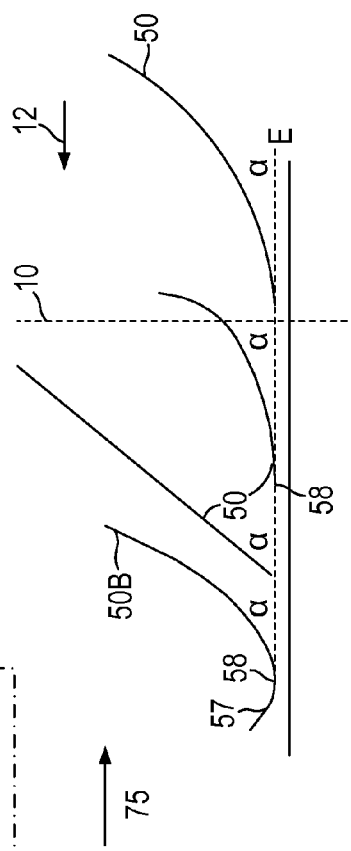

The deflector 50 has a height profile, where the height level decreases in the direction 12 of rotation of the mixing implement 3, seen from above, as can be seen from FIGS. 8 and 9. The angle included by each deflector 50 here, at least over most of its length, with a plane E is an acute angle α, where this plane E is perpendicular to the axis 10 of rotation of the rotating mixing and comminution implements 3.

The deflector 50 can extend with constant angle α in the form of a straight bar along the internal wall of the container. It is self-evident that the deflectors 50 follow the internal wall of the container and, in plan view, as depicted in FIG. 6, have an appropriate curvature along the circumference of the container. However, the angle α is measured in relation to the plane E, and in the event that a deflector 50 has a curved height profile, the respective tangential angle at the points under consideration on the deflector 50 can be taken as angle α.

It is advantageous if, as depicted in the figures, at least over a subsection of the deflector 50, the angle α is from 15° to 45°, preferably from 20° to 40°.

From FIGS. 8 and 9, it can be seen that the height profile of the deflector 50 mostly exhibits a convex curvature directed against the direction 12 of rotation of the implements 3. However, the drawing of FIG. 8 also includes a deflector 50A which has a convex curvature directed in the direction 12 of rotation of the implements 3.

FIG. 8 shows a large number of deflectors 50 having different length and/or different height profile. From FIG. 8 it can also be seen that the direction 12 of rotation of the implements 3 is opposite to the direction FS of conveying of the screw 6, as has been explained in detail with reference to FIGS. 1 to 4. The region 70 surrounding the intake aperture 80 can be seen in FIG. 8. It is advantageous that the lower end region or the lower end 58 of one or more deflectors 50 is within this region 79.

The lower end of the deflector 50 is within a circumferential region of the container wall between the two lateral edges 55, 56 of the intake aperture 80, and this region is optionally enlarged in the direction of rotation of the implements 3 only by at most from 50% to 80% of the length of a longitudinal edge 52, 53.

The lower end of the deflector 50 is moreover at a level that is within the region 70 between the upper and lower longitudinal edge 52, 53 of the intake aperture 80 and optionally at most from 50% to 80% of the height HE of the intake aperture 80 above the upper longitudinal edge 52 or at most from 20% to 30% of the height HE of the intake aperture 80 below the lower edge 53 of the intake aperture 80.

In relation to the upper ends of the deflectors, it is possible that, viewed in the direction 12 of rotation of the mixing implements 3, the upper end of the deflector 50 is at least 10° to 15°, preferably 30° to 55°, prior to that edge 56 that is associated with the intake aperture 80 and that is situated upstream in the direction of rotation, or after that edge 55 that is associated with the intake aperture 80 and that is situated downstream in the direction of rotation. This positioning of the deflectors 50 considerably improves intake performance.

Figure 10:
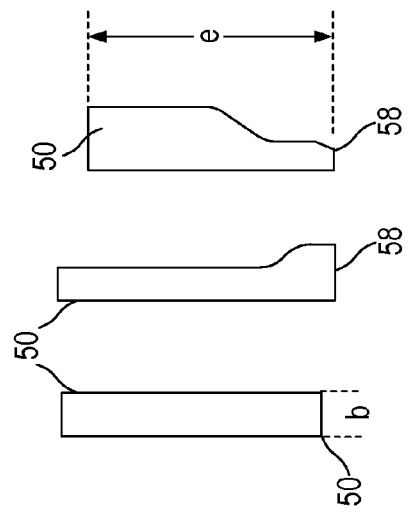
FIGS. 8 to 10 are diagrams of the arrangement and design of deflectors.

As can be seen from FIG. 10, the width b and the length l of the deflectors 50 can be adapted and prescribed to be appropriate to the prevailing conditions. FIG. 10 depicts a deflector 50 with rectangular longitudinal cross section. Alongside this on the right-hand side, the deflector 50 depicted widens in the direction towards its lower end 58, in its final section. The width b of the deflector depicted on the right-hand side differs over its length l, or the deflector has been bevelled in its end region.

It is also possible that a plurality of deflectors 50 end in the region of the intake aperture 80. It is preferable that the ends 58 of the deflectors 50 are within a circumferential region 70 that is downstream in the direction of rotation in relation to the edge 52, and it is preferable that they end at the height level of the edge 52 or therebelow 50B denotes deflectors of this type.

The other deflectors 50 arranged in the container 1 and remote from the intake aperture (80) can have the same features, in particular in relation to height profile and height level, as the deflectors 50 in the circumferential region of the intake aperture 80.

The invention claimed is:

1. An apparatus for the pretreatment and subsequent conveying, plastification or agglomeration of plastics, with a container (1) for the material to be processed, where, in the container (1), at least one mixing and/or comminution implement (3) which rotates around an axis (10) of rotation and which is intended for the mixing, heating and optionally comminution of the plastics material, where an aperture (8) through which the pretreated plastics material can be removed from the interior of the container (1) is formed in a side wall (9) of the container (1) in the region of the level of the, or of a mixing and/or comminution implement (3) that is closest to the aperture (8), where at least one conveyor (5) is provided to receive the pretreated material, and has at least one screw (6) which rotates in a housing (16) and which has plastifying or agglomerating action, where the housing (16) has, located at its end (7) or in its jacket wall, an intake aperture (80) for the material to be received by the screw (6), and there is connection between the intake aperture (80) and the aperture (8), wherein the imaginary continuation of the central longitudinal axis (15) of the conveyor (5) or of the screw (6) closest to the intake aperture (80), in a direction opposite to a direction (17) of conveying of the conveyor (5), passes, and does not intersect, the axis (10) of rotation, where, on the outflow side in a direction (12) of rotation, there is an offset distance (18) between the longitudinal axis (15) of the conveyor (5) or of the screw (6) closest to the intake aperture (80), and a radius (11) that is associated with the container (1) and that is parallel to the longitudinal axis (15) and that proceeds outwards from the axis (10) of rotation of the mixing and/or comminution implement (3) in the direction (17) of conveying of the conveyor (5), and wherein, on an internal wall area of the container (1) there is at least one bar-shaped deflector (50) which is directed into the interior of the container (1), and the height profile of which decreases in the direction (12) of rotation of the mixing implement (3), seen from above, and the angle included thereby, over its length, with a plane (E) perpendicular to the axis (10) of rotation of the mixing implement (3) is an acute angle (α), wherein the lower end representing the lowest section (58) of the deflector (50) is followed by an extension (57), which is directed upwards in the direction (12) of rotation, as a single piece.

2. The apparatus according to claim 1, wherein the acute angle (α) is constant at least in sections over the length of the deflector (50), or that the profile of the deflector (50) is curved downwards, at least over a section of its length (l), and in that case the acute angle (α) represents the tangential angle present at the respective point on the deflector (50).

3. The apparatus according to claim 1, wherein the acute angle (α) in the central region of the deflector (50), is from 15° to 45°.

4. The apparatus according to claim 1, wherein the acute angle (α) decreases towards the lower end of the deflector (50), optionally to an angle α=0°.

5. The apparatus according to claim 1, wherein the lower end (58) of the deflector (50) is within a circumference (70) between the two lateral edges (55, 56) of the intake aperture (80), and this region is optionally enlarged in the direction of rotation of the implements (3) only by at most from 50% to 80% of the length of a longitudinal edge (52, 53).

6. The apparatus according to claim 1, wherein the lower end (58) of the deflector (50) is at a height level on the container wall, where this level is within the region (70) between the upper and lower longitudinal edge (52, 53) of the intake aperture (80) and optionally at most from 50% to 80% of the height (HE) of the intake aperture (80) above the upper longitudinal edge (52) or at most from 20% to 30% of the height (HE) of the intake aperture (80) below the lower edge (53) of the intake aperture (80).

7. The apparatus according to claim 1, wherein the deflector (50) protrudes radially from the internal wall of the container.

8. The apparatus according to claim 1, wherein the bar-shaped deflector (50) has a rectangular cross section optionally rounded at the edges projecting into the container (1), and is secured by its narrow side on the internal wall of the container (1).

9. The apparatus according to claim 1, wherein the width of the deflector (50) optionally decreases in stages in the direction towards the end, or that the deflector (50) is widened in the end region.

10. The apparatus according to claim 1, wherein, viewed in the direction (12) of rotation of the mixing implements (3), the upper end of the deflector (50) is at least 10° to 15°, prior to that edge (56) that is associated with the intake aperture (80) and that is situated upstream in the direction of rotation, or after that edge (55) that is associated with the intake aperture (80) and that is situated downstream in the direction of rotation.

11. The apparatus according to claim 1, wherein the width (b) of the deflector (50) is in the range from 1% to 10% of the diameter of the container, and/or that the width of the deflector (50) is greater than 15 mm.

12. The apparatus according to claim 1, wherein the deflector (50) ends outside of the open cross section of the intake aperture (80).

13. The apparatus according to claim 1, wherein, for a conveyor (5) in contact with the container (1), the scalar product of a direction vector describing the portion of the mixing and/or comminution implement (3) nearest the aperture when the mixing and/or comminution implement (3) is adjacent the aperture, and another direction vector describing the conveying of the conveyor (5) is zero or negative.

14. The apparatus according to claim 1, wherein an angle (β) between a direction vector describing the motion of the portion of the mixing and/or comminution implement (3) nearest the aperture when the mixing and/or comminution implement (3) is adjacent the aperture, and another direction vector describing the direction of the conveying of the conveyor (5) is greater than or equal to 90° and less than or equal to 180°.

15. The apparatus according to claim 1, wherein an angle (β) between a direction vector describing the motion of the portion of the mixing and/or comminution implement (3) nearest the aperture when the mixing and/or comminution implement (3) is adjacent the aperture, and another direction vector describing the direction of the conveying of the conveyor (5) is from 170° to 180°.

16. The apparatus according to claim 1, wherein the offset distance (18) is greater than or equal to half of the internal diameter of the housing (16) of the conveyor (5) or of the screw (6), and/or greater than or equal to 7%, of the radius of the container (1), or wherein the distance (18) is greater than or equal to the radius of the container (1).

17. The apparatus according to claim 1, wherein the imaginary continuation of the longitudinal axis (15) of the conveyor (5) in a direction opposite to the direction of conveying is arranged in the manner of a secant in relation to the cross section of the container (1), and, at least in sections, passes through the space within the container (1).

18. The apparatus according to claim 1, wherein the conveyor (5) is attached tangentially to the container (1) or runs tangentially in relation to the cross section of the container (1), or wherein the longitudinal axis (15) of the conveyor (5) or of the screw (6) or the longitudinal axis of the screw (6) closest to the intake aperture (80) runs tangentially with respect to the inner side of the side wall (9) of the container (1), or the inner wall of the housing (16) does so, or the enveloping end of the screw (6) does so, where there is a drive connected to the end (7) of the screw (6), and that the screw provides conveying, at its opposite end, to a discharge aperture which is an extruder head and which is arranged at the end of the housing (16).

19. The apparatus according to claim 1, wherein there is immediate and direct connection between the aperture (8) and the intake aperture (80), without substantial separation, and without transfer section or conveying screw.

20. The apparatus according to claim 1, wherein the mixing and/or comminution implement (3) comprises implements and/or blades (14) which, in the direction (12) of rotation or of movement, have a comminuting, cutting and heating effect on the plastics material, where the implements and/or blades (14) are arranged or formed on or at a rotatable implement carrier and which is arranged parallel to a basal surface (12).

21. The apparatus according to claim 1, wherein frontal edges (22) that are associated with blades (14) of the mixing and/or comminution implement (3) act on the plastics material and point in the direction (12) of rotation or of movement, differs when comparison is made with the regions that, in the direction (12) of rotation or of movement, the rearward regions or rearward edges (22) of the mixing and/or comminution implement (3) or the blades (14).

22. The apparatus according to claim 1, wherein the container (1) is substantially cylindrical with circular cross section and with a level basal surface (2) and with, orientated vertically in relation thereto, a side wall (9) which has the shape of the jacket of a cylinder, and/or the axis (10) of rotation of the mixing and/or comminution implement (3) coincides with the central axis of the container (1), and/or the axis (12) of rotation or the central axis are orientated vertically and/or normally in relation to the basal surface (2).

23. The apparatus according to claim 1, wherein a lowest implement carrier (13) or a lowest of the mixing and/or comminution implement (3) and/or the aperture (8) are arranged in the lowest quarter of the height of the container (1), at a distance of from 10 mm to 400 mm from a basal surface (2).

* * * * *